US012729452B2

(12) United States Patent
Chen et al.

(10) Patent No.: US 12,729,452 B2
(45) Date of Patent: Sep. 8, 2026

(54) MIXED ACID ANODIZATION

(71) Applicant: RTX Corporation, Farmington, CT (US)

(72) Inventors: Lei Chen, South Windsor, CT (US); Mimi Nguyen-Vu, Berlin, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/936,447

(22) Filed: Nov. 4, 2024

(65) Prior Publication Data

US 2025/0059668 A1 Feb. 20, 2025

Related U.S. Application Data

(62) Division of application No. 17/097,614, filed on Nov. 13, 2020, now Pat. No. 12,134,828.

(51) Int. Cl.

| | |
|---|---|
| ***C25D 11/08*** | (2006.01) |
| ***C09D 5/44*** | (2006.01) |
| ***C25D 5/44*** | (2006.01) |
| ***C25D 11/10*** | (2006.01) |
| ***C25D 11/12*** | (2006.01) |

(52) U.S. Cl.

CPC ............ *C25D 11/08* (2013.01); *C09D 5/4484* (2013.01); *C25D 11/10* (2013.01); *C25D 11/12* (2013.01)

(58) Field of Classification Search

None

See application file for complete search history.

(56) References Cited

U.S. PATENT DOCUMENTS

| | | | | |
|---|---|---|---|---|
| 3,666,638 | A | 5/1972 | Harris et al. | |
| 3,836,439 | A | 9/1974 | Ikegaya et al. | |
| 3,915,811 | A | 10/1975 | Tremmel et al. | |
| 4,022,671 | A | 5/1977 | Asada | |
| 4,894,127 | A | 1/1990 | Wong et al. | |
| 5,674,371 | A | 10/1997 | Patel | |
| 6,149,795 | A | 11/2000 | Oelund et al. | |
| 9,797,059 | B2 | 10/2017 | Ikawa et al. | |
| 10,094,037 | B2 | 10/2018 | Ding et al. | |
| 10,309,029 | B2 | 6/2019 | Duffy et al. | |
| 2016/0017510 | A1 | 1/2016 | Jaworowski et al. | |
| 2016/0312374 | A1* | 10/2016 | Duffy | C25D 11/06 |
| 2017/0129215 | A1 | 5/2017 | Ding et al. | |
| 2022/0154361 | A1 | 5/2022 | Chen et al. | |

FOREIGN PATENT DOCUMENTS

| | | | | |
|---|---|---|---|---|
| CA | 2491095 | C | 6/2012 | |
| CN | 101792920 | A | 8/2010 | |
| CN | 107227477 | A * | 10/2017 | C25D 11/18 |
| CN | 109082695 | A | 12/2018 | |
| CN | 111088511 | A | 5/2020 | |
| GB | 1391808 | A | 4/1975 | |

OTHER PUBLICATIONS

Ji et al. CN 107227477 A, machine translation (Year: 2017).*

European Office Action corresponding to EP Application No. 21 206 734.2; Issue Date, Nov. 15, 2023, 6 pages.

European Search Report for application EP 21206734.2, dated Mar. 29, 2022, 13 pages.

European Search Report for EP Application No. 21206734.2, Issue Date, Apr. 20, 2022, 14 pages.

Ono et al.; Surface and Coating Technology; 169-170 '2003' 139-142 (Year: 2003).

U.S. Final Office Action corresponding to U.S. Appl. No. 17/097,614; Issue Date, Nov. 13, 2020, 9 pages.

U.S. Final Office Action corresponding to U.S. Appl. No. 17/097,614; Issue Date, Oct. 4, 2023, 21 pages.

U.S. Non-Final Office Action corresponding to U.S. Appl. No. 17/097,614; Issue Date, Dec. 14, 2022, 30 pages.

Wang, et al.; Corrosion Science and Protection Technology, 2014, vol. 26, No. 2, 154-158 (Year: 2014).

* cited by examiner

*Primary Examiner* — Wojciech Haske

(74) *Attorney, Agent, or Firm* — CANTOR COLBURN LLP

(57) ABSTRACT

Disclosed are methods of anodizing a metal component. In the methods an anodization bath includes an organic acid.

14 Claims, No Drawings

MIXED ACID ANODIZATION

CROSS REFERENCE TO RELATED APPLICATIONS

This application is a divisional of U.S. patent application Ser. No. 17/097,614 filed on Nov. 13, 2020, the entire contents of which are incorporated herein by reference thereto.

BACKGROUND

Exemplary embodiments pertain to the art of corrosion protection for anodized metals.

Anodized metals such as high strength aluminum alloys are used in a variety of applications and can be subjected to harsh conditions. Anodization creates an electrochemically grown layer (an anodization layer) from the base metal to provide corrosion resistance for metal substrates. Anodization layers comprise porous oxides and compounds co-deposited during the anodization process. The anodization layer needs to be sealed for enhanced corrosion resistance. In some instances, the anodized metals can experience corrosion as a result of exposure to heavy air pollution. The corrosion can include both inter-granular attack and localized corrosion such as pitting.

BRIEF DESCRIPTION

Disclosed is a method of making an anodized metal component including anodizing a metal component in an anodizing bath to form an anodization layer wherein the anodizing bath comprises two or more inorganic acids selected from the group consisting of sulfuric, boric and phosphoric acids, and an organic acid selected from the group consisting of oxalic acid, acetic acid, tartaric acid, malic acid, tannic acid, an α-amino acid such as alanine, an aromatic alpha hydroxy acid such as mandelic acid, phenylalanine, and salicylic acid.

In addition to one or more of the features described above, or as an alternative to any of the foregoing embodiments, the metal component includes aluminum or an aluminum alloy.

In addition to one or more of the features described above, or as an alternative to any of the foregoing embodiments, the inorganic acids include sulfuric acid and boric acid.

In addition to one or more of the features described above, or as an alternative to any of the foregoing embodiments, the anodizing bath includes 5 grams per liter (g/L) to 60 g/L of sulfuric acid.

In addition to one or more of the features described above, or as an alternative to any of the foregoing embodiments, the anodizing bath includes 0.5 g/L to 15 g/L boric acid.

In addition to one or more of the features described above, or as an alternative to any of the foregoing embodiments, the anodizing bath includes 0.5 g/L to 100 g/L of organic acid.

In addition to one or more of the features described above, or as an alternative to any of the foregoing embodiments, anodizing is performed at a temperature of 70° F. to 90° F.

Also disclosed is a method of making an anodized metal component including anodizing a metal component in a first anodizing bath to form an initial anodization layer and anodizing the metal component with the initial anodization layer in a second anodizing bath to form a metal component with a final anodization layer wherein the first and second anodizing baths include at least one inorganic acid selected from the group consisting of sulfuric, boric and phosphoric acids and an organic acid and the first anodizing bath and the second anodizing baths have different compositions and operating temperatures.

In addition to one or more of the features described above, or as an alternative to any of the foregoing embodiments, the first anodizing bath includes a first organic acid and the second anodizing bath includes a second organic acid different from the first organic acid.

In addition to one or more of the features described above, or as an alternative to any of the foregoing embodiments, the first anodizing bath has a higher temperature than the second anodization bath.

In addition to one or more of the features described above, or as an alternative to any of the foregoing embodiments, the first and second anodizing baths include the same organic acid in differing amounts.

In addition to one or more of the features described above, or as an alternative to any of the foregoing embodiments, the organic acid is selected from the group consisting of oxalic acid, acetic acid, tartaric acid, malic acid, tannic acid, an α-amino acid such as alanine, an aromatic alpha hydroxy acid such as mandelic acid, phenylalanine, and salicylic acid.

In addition to one or more of the features described above, or as an alternative to any of the foregoing embodiments, the inorganic acid is sulfuric acid. The anodizing bath includes sulfuric acid in an amount of 5 grams per liter (g/L) to 60 g/L.

In addition to one or more of the features described above, or as an alternative to any of the foregoing embodiments, the first anodization bath includes organic acid in an amount of 0.5 g/L to 100 g/L and the second anodizing bath includes organic acid in an of 1 g/L to 30 g/L.

In addition to one or more of the features described above, or as an alternative to any of the foregoing embodiments, the first anodization bath has a temperature of 85 to 100° F. and the second anodization bath has a temperature of 74 to 85° F.

Also disclosed is a method of making an anodized metal component including anodizing a metal component in a first anodizing bath to form an initial anodization layer and anodizing the metal component with an initial anodization layer in a second anodizing bath to form a metal component with a final anodization layer wherein the first anodizing bath includes at least one inorganic acid selected from the group consisting of sulfuric acid, boric acid and phosphoric acid, and an organic acid and the second anodizing bath includes at least two inorganic acids selected from the group consisting of sulfuric acid, boric acid and phosphoric acid.

In addition to one or more of the features described above, or as an alternative to any of the foregoing embodiments, the organic acid is selected from the group consisting of oxalic acid, acetic acid, tartaric acid, malic acid, tannic acid, an α-amino acid such as alanine, an aromatic alpha hydroxy acid such as mandelic acid, phenylalanine, and salicylic acid.

In addition to one or more of the features described above, or as an alternative to any of the foregoing embodiments, the first anodizing bath has a temperature higher than the second anodizing bath.

In addition to one or more of the features described above, or as an alternative to any of the foregoing embodiments, the first and second anodizing baths include sulfuric acid in an amount of 5 g/L to 60 g/L.

In addition to one or more of the features described above, or as an alternative to any of the foregoing embodiments, the first anodizing bath includes the organic acid in an amount of 0.5 g/L to 100 g/L and the second anodizing bath includes boric acid in an amount of 0.5 g/L to 15 g/L.

DETAILED DESCRIPTION

A detailed description of one or more embodiments of the disclosed apparatus and method are presented herein by way of exemplification and not limitation.

Anodizing is an electrolytic passivation process where a metal substrate operates as an anode in an electrical circuit and an anodization layer is grown on the surface of the article as a result of converting a metallic element (that is part of the metal substrate) to oxides and related compounds. The anodizing process is commonly used to create an anodization layer on aluminum alloys. The anodization layer is porous and needs to be sealed to prevent corrosive species from contacting the base alloy. It has been found that binary acid anodization using two inorganic acids such as boric acid and sulfuric acid or anodization using a single inorganic acid can produce an anodization layer which is subsequently sealed. However, the physical barrier resulting from sealing is usually not sufficient for protecting the substrate, particularly in an aggressive environment. Consequently, it is a common practice to include corrosion inhibitors in the sealing solution to retard base alloy corrosion in case of the anodization layer being defeated locally. Some aluminum alloys are susceptible to inter-granular attacks (IGA) particularly in environments with significant air pollution. Without being bound by theory it is believed that air pollution results in an acidic environment which contributes to the inter-granular attacks. It was found that anodization layers produced by known anodization processes are prone to acid attacks and subsequent base alloy localized corrosion such as IGA. In order to improve resistance to inter-granular attacks it is highly desirable to provide acid resistant chemistry and IGA inhibitors in an anodization layer. In immersion tests, it has been demonstrated that several organic acids act as IGA inhibitors that effectively protect aluminum alloys from grain boundary attacks. Due to their solubility in water and mobility, these organic acids must be immobilized in an anodization layer. Thus, a mixed acid system containing at least three acids has been developed to impart both acid and corrosion resistance while maintaining the barrier properties of conventional binary acid anodization methods. More specifically, a boric acid and sulfuric acid are combined with an organic acid in the anodization bath and the resulting anodization layer has the organic corrosion inhibitors incorporated in place of a portion of the sulfate. Laboratory work conducted has shown that the modified anodization layer dissolves more slowly in a mineral acid environment and the carboxylates tend to adsorb on aluminum alloys to displace deleterious corrosive species such as chloride, leading to better corrosion protection.

As disclosed herein an anodized metal component may be produced using a single anodization bath or two anodization baths. The single bath method includes anodizing a metal component in an anodizing bath to form an anodization layer wherein the anodizing bath includes at least two inorganic acids selected from the group consisting of sulfuric acid, phosphoric acid and boric acid, and an organic acid selected from the group consisting of oxalic acid, acetic acid, tartaric acid, malic acid, tannic acid, an α-amino acid such as alanine, an aromatic alpha hydroxy acid such as mandelic acid, phenylalanine and salicylic acid. The metal component produced using this method has an anodization layer that includes compounds derived from the organic acid. The selected organic acids exhibit inhibiting effects for localized corrosion, particularly in an acidic environment (pH 2 to 5). More specifically, the organic acids or their anions can cause the pitting potential ($E_{pit}$) of an aluminum alloy to separate from its uniform corrosion potential ($E_{corr}$) by at least 20 mV more in relation to that in an electrolyte without the organic anions.

In some embodiments the inorganic acids include sulfuric acid and boric acid. The sulfuric acid may be present in the anodizing bath in an amount greater than or equal to 5 grams per liter (g/L) and less than or equal to 60 g/L. Within this range the amount of sulfuric acid may be greater than or equal to 10 g/L. Also, within this range the amount of sulfuric acid may be less than or equal to 50 g/L.

The boric acid may be present in the anodizing bath in an amount greater than or equal to 0.5 g/L and less than or equal to 15 g/L. Within this range the amount of boric acid may be greater than or equal to 2 g/L. Also, within this range the amount of boric acid may be less than or equal to 10 g/L.

The organic acid may be present in the anodizing bath in an amount greater than or equal to 0.5 g/L and less than or equal to 100 g/L. Within this range the amount of carboxylic acid may be greater than or equal to 5 g/L. Also, within this range the amount of carboxylic acid may be less than or equal to 80 g/L.

Anodizing is performed by applying a DC voltage ramped up from 0 to a plateau voltage over a period of 1 to 5 minutes. The plateau voltage can vary from 13 to 20 volts and is maintained for a duration of 10 to 25 minutes. The anodizing temperature can be 70° F. to 90° F., or 74° F. to 85° F.

The second method includes anodizing a metal component in a first anodizing bath to form an initial anodization layer and anodizing the metal component with the initial anodization layer in a second anodizing bath to form a metal component with a final anodization layer wherein the first and second anodizing baths include at least one inorganic acid selected from the group consisting of sulfuric acid, phosphoric acid and boric acid, and an organic acid and the first anodizing bath and the second anodizing baths have different compositions and operating temperatures. The first and second baths may have different organic acids or may have different amounts of the same organic acid.

In some embodiments the inorganic acid includes sulfuric acid. The sulfuric acid may be present in either anodizing bath in an amount greater than or equal to 5 grams per liter (g/L) and less than or equal to 60 g/L. Within this range the amount of sulfuric acid may be greater than or equal to 10 g/L. Also, within this range the amount of sulfuric acid may be less than or equal to 50 g/L.

Exemplary organic acids include oxalic acid, acetic acid, tartaric acid, malic acid, tannic acid, an α-amino acid such as alanine, an aromatic alpha hydroxy acid such as mandelic acid, phenylalanine and salicylic acid.

The organic acid may be present in the first anodizing bath in an amount greater than or equal to 0.5 g/L and less than or equal to 100 g/L. Within this range the amount of organic acid may be greater than or equal to 5 g/L. Also, within this range the amount of organic acid may be less than or equal to 80 g/L.

The organic acid may be present in the second anodizing bath in an amount greater than or equal to 1 g/L and less than or equal to 30 g/L. Within this range the amount of organic acid may be greater than or equal to 3 g/L. Also, within this range the amount of organic acid may be less than or equal to 20 g/L.

The first anodization bath has a temperature higher than the temperature of the second anodization bath. The first anodization bath may have a temperature of 85 to 100° F. and the second anodization bath may have a temperature of 74 to 85° F.

Anodizing is performed by applying a DC voltage ramped from 0 to a plateau voltage over a period of 1 to 5 minutes. The plateau voltage can vary from 13 to 20 volts and is maintained for a duration of 10 to 25 minutes.

A third method includes anodizing a metal component in a first anodizing bath to form an initial anodization layer and anodizing the metal component with the initial anodization layer in a second anodizing bath to form a metal component with a final anodization layer wherein the first anodizing bath includes at least one inorganic acid selected from the group consisting of sulfuric acid, phosphoric acid and boric acid, and an organic acid and the second anodizing bath includes at least two inorganic acids selected from the group consisting of sulfuric acid, phosphoric acid and boric acid. The two anodization baths have different temperatures. The first anodization bath has a higher temperature than the second anodization bath. The variable anodization temperature creates favorable differential film morphologies. The first anodization is conducted at a higher temperature (85° F. to 100° F.) to yield a relatively more porous structure, followed by anodization operation in a bath with two inorganic acids such as boric acid and sulfuric acid. The first anodization produces an oxide layer with an apparent density of 1.3 to 1.7 g/cm$^3$, whereas the second bath is operated in a lower temperature range of 74° F. to 85° F. for a denser film (apparent density 1.6 to 2.4 g/cm$^3$).

The organic acid may be present in the first anodizing bath in an amount greater than or equal to 0.5 g/L and less than or equal to 100 g/L. Within this range the amount of organic acid may be greater than or equal to 5 g/L. Also, within this range the amount of organic acid may be less than or equal to 80 g/L.

The organic acid is selected from the group consisting of oxalic acid, acetic acid, tartaric acid, malic acid, tannic acid, an $\alpha$-amino acid such as alanine, an aromatic alpha hydroxy acid such as mandelic acid, phenylalanine, and salicylic acid.

In some embodiments the inorganic acids include sulfuric acid and boric acid. The sulfuric acid may be present in the first or second anodizing bath in an amount greater than or equal to 5 g/L and less than or equal to 60 g/L. Within this range the amount of sulfuric acid may be greater than or equal to 10 g/L. Also, within this range the amount of sulfuric acid may be less than or equal to 50 g/L. The amount of sulfuric acid in the first anodizing bath may be the same as or different from the amount of sulfuric acid in the second anodizing bath.

Boric acid may be present in the second anodizing bath in an amount greater than or equal to 0.5 g/L and less than or equal to 15 g/L. Within this range the amount of boric acid may be greater than or equal to 2 g/L. Also, within this range the amount of boric acid may be less than or equal to 10 g/L.

Anodizing is performed by applying a DC voltage ramped from 0 to a plateau voltage over a period of 1 to 5 minutes. The plateau voltage can vary from 13 V to 20 V and is maintained for a duration of 10 to 25 minutes. The anodizing temperature for the first organic acid/inorganic acid mixture can be 85° F. to 100° F., or 90° F. to 95° F. The anodizing temperature of the second bath with two inorganic acids can be 74° F. to 85° F., or 78° F. to 82° F.

After anodization the metal component may be sealed as known in the art. Exemplary sealing methods include hydrothermal sealing or contact with a dilute chromate solution at a temperature greater than or equal to 90° C. for a time greater than or equal to 10 minutes. Alternative sealing methods include non-chromate sealing such as trivalent chromium sealing, TCP.

The above described methods result in a metal component including a metal substrate and an anodization layer wherein the anodization layer has an apparent density of 1.6 g/cm$^3$ to 2.4 g/cm$^3$ and a thickness less than or equal to 3.4 μm and greater than 1.5 μm and the anodization layer comprises sulfate and a carboxylate or amino acid inclusion. The metal component is useful in a range of applications including stator vanes, fan cases and shrouds for gas turbine engines.

The metal substrate includes aluminum or an aluminum alloy. Exemplary aluminum alloys include the 2000 series which also contains copper and magnesium. The aluminum alloy may include 1 to 5 weight percent copper. Other useful aluminum alloys include 7000 and 6000 series alloys.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of making an anodized metal component comprising anodizing a metal component in a first anodizing bath to form an initial anodization layer and anodizing the metal component with the initial anodization layer in a second anodizing bath to form a metal component with a final anodization layer wherein the first and second anodizing baths comprise at least one inorganic acid selected from the group consisting of sulfuric acid, boric acid and phosphoric acid, and an organic acid and the first anodizing bath and the second anodizing baths have different compositions and operating temperatures;

wherein anodizing is performed by applying a DC voltage ramped from 0 to a plateau voltage over a period of 1 to 5 minutes, the plateau voltage can vary from 13 to 20 volts and is maintained for a duration of 10 to 25 minutes;

wherein sulfuric acid is present in the first anodizing bath or the second anodizing bath in an amount of 5 grams per liter (g/L) to 60 g/L; and wherein the first anodization bath comprises organic acid in an amount of 0.5 g/L to 100 g/L and the second anodizing bath comprises organic acid in an of 1 g/L to 30 g/L.

2. The method of claim 1, wherein the first anodizing bath comprises a first organic acid and the second anodizing bath comprises a second organic acid different from the first organic acid.

3. The method of claim 1, wherein the first anodizing bath has a higher temperature than the second anodization bath.

4. The method of claim 1, wherein the first and second anodizing baths comprise the same organic acid in differing amounts.

5. The method of claim 1, wherein the organic acid is selected from the group consisting of oxalic acid, acetic acid, tartaric acid, malic acid, tannic acid, an $\alpha$-amino acid, an aromatic alpha hydroxy acid, phenylalanine, and salicylic acid.

6. The method of claim 1, wherein the inorganic acid is sulfuric acid.

7. The method of claim 6, wherein the first anodizing bath or the second anodizing bath comprises sulfuric acid in an amount of 10 grams per liter (g/L) to 50 g/L.

8. The method of claim 1, wherein the first anodization bath comprises organic acid in an amount of 5 g/L to 80 g/L and the second anodizing bath comprises organic acid in an of 3 g/L to 20 g/L.

9. The method of claim 1, wherein the first anodization bath has a temperature of 85 to 100° F. and the second anodization bath has a temperature of 74 to 85° F.

10. A method of making an anodized metal component comprising anodizing a metal component in a first anodizing bath to form an initial anodization layer and anodizing the metal component with an initial anodization layer in a second anodizing bath to form a metal component with a final anodization layer wherein the first anodizing bath comprises at least one inorganic acid selected from the group consisting of sulfuric acid, boric acid and phosphoric acid, and an organic acid and the second anodizing bath comprises at least two inorganic acids selected from the group consisting of sulfuric acid, boric acid and phosphoric acid;

wherein anodizing is performed by applying a DC voltage ramped from 0 to a plateau voltage over a period of 1 to 5 minutes, the plateau voltage can vary from 13 to 20 volts and is maintained for a duration of 10 to 25 minutes;

wherein the first anodizing bath or the second anodizing bath comprise sulfuric acid in an amount of 5 g/L to 60 g/L; and wherein the first anodizing bath comprises the organic acid in an amount of 0.5 g/L to 100 g/L and the second anodizing bath comprises boric acid in an amount of 0.5 g/L to 15 g/L.

11. The method of claim 10, wherein the organic acid is selected from the group consisting of oxalic acid, acetic acid, tartaric acid, malic acid, tannic acid, an $\alpha$-amino acid, an aromatic alpha hydroxy acid, phenylalanine, and salicylic acid.

12. The method of claim 10, wherein the first anodization bath has a higher temperature than the second anodization bath.

13. The method of claim 10, wherein the first and second anodizing baths comprise sulfuric acid in an amount of 10 g/L to 50 g/L.

14. The method of claim 13, wherein the first anodizing bath comprises the organic acid in an amount of 5 g/L to 80 g/L and the second anodizing bath comprises boric acid in an amount of 2 g/L to 10 g/L.

* * * * *